United States Patent
Galbreath, Jr.

(10) Patent No.: US 6,190,716 B1
(45) Date of Patent: Feb. 20, 2001

(54) METHOD FOR PREPARING A GRAPE DERIVED PRODUCT

(76) Inventor: Scott O. Galbreath, Jr., 64 S. Concord, Natchez, MS (US) 39120

(*) Notice: Under 35 U.S.C. 154(b), the term of this patent shall be extended for 0 days.

(21) Appl. No.: 09/251,655

(22) Filed: Feb. 17, 1999

(51) Int. Cl.⁷ ................................................. A23L 1/015
(52) U.S. Cl. ..................... 426/443; 426/478; 426/479; 426/481; 426/482; 426/615; 426/640; 426/495
(58) Field of Search ............................... 426/442, 465, 426/478, 479, 481, 482, 495, 615, 640, 443

(56) References Cited

U.S. PATENT DOCUMENTS

| | | | |
|---|---|---|---|
| 3,910,173 | * 10/1975 | Zepponi | 99/277.1 |
| 4,211,577 | * 7/1980 | Wallin | 106/288 |
| 4,302,200 | * 11/1981 | Yokoyama et al. | 8/438 |
| 4,673,578 | * 6/1987 | Becker et al. | 426/93 |
| 4,820,527 | * 4/1989 | Christensen et al. | 426/2 |
| 5,171,577 | * 12/1992 | Griat et al. | 424/450 |
| 5,411,742 | * 5/1995 | Sebag et al. | 424/450 |
| 5,554,645 | * 9/1996 | Romanczyk, Jr. et al. | 514/453 |
| 5,633,435 | * 5/1997 | Barry et al. | 800/205 |
| 5,639,794 | * 6/1997 | Emerson et al. | 514/699 |
| 5,712,305 | * 1/1998 | Romanczyk, Jr. et al. | 514/453 |
| 5,738,887 | * 4/1998 | Wu | 426/51 |
| 5,776,889 | * 7/1998 | Wei et al. | 514/2 |
| 5,780,060 | * 7/1998 | Levy et al. | 424/489 |

FOREIGN PATENT DOCUMENTS

99/01148 * 1/1999 (WO).

OTHER PUBLICATIONS

Ector, B. J., et al., "Resveratrol Concentration in Muscadine Berries, Juice, Pomace, Purees, Seeds, and Wines", American Journal of Enology and Viticulture, vol. 47(1), pp. 57–62, 1996.*

* cited by examiner

Primary Examiner—Milton Cano

(57) ABSTRACT

A method for preparing a natural product including crushing and dejuicing muscadine grapes. The method includes breaking down the pulp of the crushed and dejuiced muscadines through heating the pomice and enzymatic action through a predetermined period. The method further includes removing the broken down pulp from the pomice. The method further includes placing the skins and seeds of the extruded pulp into net bags and closing the bags and placing the bags in a dryer at an elevated temperature and drying the contents of the bags to a predetermined moisture. The method further includes bagging the dried material and storing the food-grade containers in a room at a predetermined temperature and finely grinding the dried material.

7 Claims, 1 Drawing Sheet

METHOD FOR PREPARING A GRAPE DERIVED PRODUCT

BACKGROUND OF THE INVENTION

1. Field of the Invention

The present invention relates to a method for preparing a natural product and more particularly pertains to preparing natural products that are readily digestible upon consumption as a food supplement containing high quantities of resveratrol, ellagic acid, and other phenolic compounds and antioxidants.

2. Description of the Prior Art

The use of natural food products of known designs and configurations is known in the prior art. More specifically, natural foods products of known designs and configurations heretofore devised and utilized for the purpose of preparing food products for consumption as food supplements through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,910,173 to Zepponi discloses a Wine Grape Processing Apparatus. U.S. Pat. No. 4,211,577 to Wallin discloses a Process of Purifying Plant Anthocyanin Colors from Natural Products. U.S. Pat. No. 4,820,527 to Christensen et al. discloses a Method of Feeding Ruminants. U.S. Pat. No. 4,302,200 to Yokoyama discloses a Process for Extracting Anthocyanin-type Colors from Natural Products. U.S. Pat. No. 5,171,577 to Griat et al. discloses a Process for the Preparation of Foams which can be used in the Cosmetics and Pharmaceutical Field and Foams Obtained by this Process. U.S. Pat. No. 5,411,742, to Sebag et al. discloses Compositions for the Treatment of Acne Containing a Derivative of Salicylic Acid and Derivatives of Salicylic Acid. U.S. Pat. No. 5,554,645 to Romanczyk, Jr., et al. discloses Antineoplastic Cocoa Extracts and Methods for Making and Using the Same. U.S. Pat. No. 5,633,435 to Barry et al. discloses Glyphosate-Tolerant S-Enolpyruvylshikmate-3-Phosphate Synthases. U.S. Pat. No. 5,639,794 to Emerson et al. discloses the Use of Saponin in Methods and Compositions for Pathogen Control. U.S. Pat. No. 5,712,305 to Romanczyk, Jr., et al. discloses Antineoplastic Cocoa Extracts and Methods for Making and Using the Same. U.S. Pat. No. 5,738,887 to Wu discloses a Process of Preparing Fruit/Vegetable Juice and Protein Emulsion with Multi-Enzyme System. U.S. Pat. No. 5,776,889 to Wei et al discloses Hypersensitive Response Induced Resistance in Plants. U.S. Pat. No. 5,780,060 to Levy et al discloses Microcapsules with a Wall of Crosslinked Plant Polyphenols and Compositions Containing Them. Lastly, U.S. Pat. No. 4,673,578 to Beker et al. discloses a Snack Food Product with High Dietary Fiber Content and Process for Producing the Same.

While these devices fulfill their respective, particular objectives and requirements, the aforementioned patents do not describe a method for preparing a natural product as disclosed herein.

In this respect, the method for preparing a natural product according to the present invention substantially departs from the conventional concepts and designs of the prior art, and in doing so provides an apparatus primarily developed for the purpose of preparing natural products that are readily digestible upon consumption as a dietary supplement containing high quantities of resveratrol, ellagic acid, and other phenolic compounds and antioxidants.

Therefore, it can be appreciated that there exists a continuing need for a new and improved method for preparing a natural product that is readily digestible upon consumption as a dietary supplement containing high quantities of resveratrol, ellagic acid, and other phenolic compounds and antioxidants. In this regard, the present invention substantially fulfills this need.

SUMMARY OF THE INVENTION

In view of the foregoing disadvantages inherent in the known types of natural food products of known designs and configurations now present in the prior art, the present invention provides an improved method for preparing a natural product. As such, the general purpose of the present invention, which will be described subsequently in greater detail, is to provide a new and improved method for preparing a natural product which has all the advantages of the prior art and none of the disadvantages.

To attain this, the present invention essentially comprises a new and improved method for preparing a natural product that is readily digestible upon consumption as a dietary supplement containing high quantities of resveratrol, ellagic acid, and other phenolic compounds and antioxidants. The Main Method of the present invention comprises the step of first crushing the muscadine grapes following standard operational procedures. Second, the crushed fruit is processed through one of three distinct methods (Alpha, Beta, Gamma). A third step of the Main Method comprises placing the pomace into a modified, rotary drum dryer at about 180 degrees Fahrenheit and drying the contents to less than 1 percent moisture. The fourth step of the Main Method comprises bagging the dried material into plastic freezer bags and storing in food-grade containers in a room with a temperature of between about 60 degrees and 70 degrees Fahrenheit. The fifth step of the Main Method consists of blending materials produced through Alpha, Beta, or Gamma. Lastly, a step of the Main Method comprises finely grinding the dried materials before encapsulating such material in gelatin capsules or other food products.

Alpha Method:

The Alpha Method of the present invention comprises the steps of crushing and pressing muscadine grapes (vitis rotundifolia) following standard operational procedures. A bladder press is used in the pressing operation. Process control is returned to the Main Method outlined above for drying, blending, grinding and using.

Beta Method:

The Beta Method of the present invention comprises the steps of crushing and pressing muscadine grapes (vitis rotundifolia) following standard operational procedures. A bladder press is used in the pressing operation. A second step of this method comprises breaking down the pulp of the crushed and dejuiced muscadines through heating the pomace following enzymatic action through a period of 24 to 36 hours. A third step of this method comprises removing the broken-down pulp (puree) from the pomace by extruders. Process control is returned to the Main Method outlined above for drying, blending, grinding and using.

Gamma Method:

The Gamma Method of the present invention comprises the steps of crushing muscadine grapes (vitis rotundifolia) following standard operational procedures. A second step of the method comprises the fermentation of the juice in the crushed grapes. A third step of this method comprises removing the fermenting juice from the must by pressing. A bladder press is used in the pressing operation. Process control is returned to the Main Method outlined above for drying, blending, grinding and using.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved method for preparing a natural product which has all of the advantages of the prior art natural food products of known designs and configurations and none of the disadvantages.

It is another object of the present invention to provide a new and improved method for preparing a natural product which may be easily and efficiently manufactured and marketed.

A further object of the present invention is to provide a new and improved method for preparing a natural product which is of durable and reliable constructions.

An even further object of the present invention is to provide a new and improved method for preparing a natural product which is low in cost to manufacture in regard to both materials and labor, and which accordingly is then susceptible of low prices of sale to the consuming public, thereby making such Method for preparing a natural product economically available to the buying public.

Even still another object of the present invention is to provide a method for preparing a natural product that is readily digestible upon consumption as a dietary supplement containing high quantities of resveratrol, ellagic acid, and other phenolic compounds and antioxidants.

Lastly, it is an object of the present invention to provide a new and improved method for preparing a natural product comprising: crushing muscadine grapes following standard operational procedures. The method of preparing the crushed muscadines includes one of three methods (Alpha, Beta, Gamma) for drying. The method further includes placing the pomace into a modified, rotary drum dryer at an elevated temperature and drying the contents to a predetermined moisture. Furthermore the method includes bagging the dried material and storing in food-grade containers in a room at a predetermined temperature. Finally the method includes the blending of the dried matter produced through Alpha, Beta, or Gamma methods; and then finely grinding the dried material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
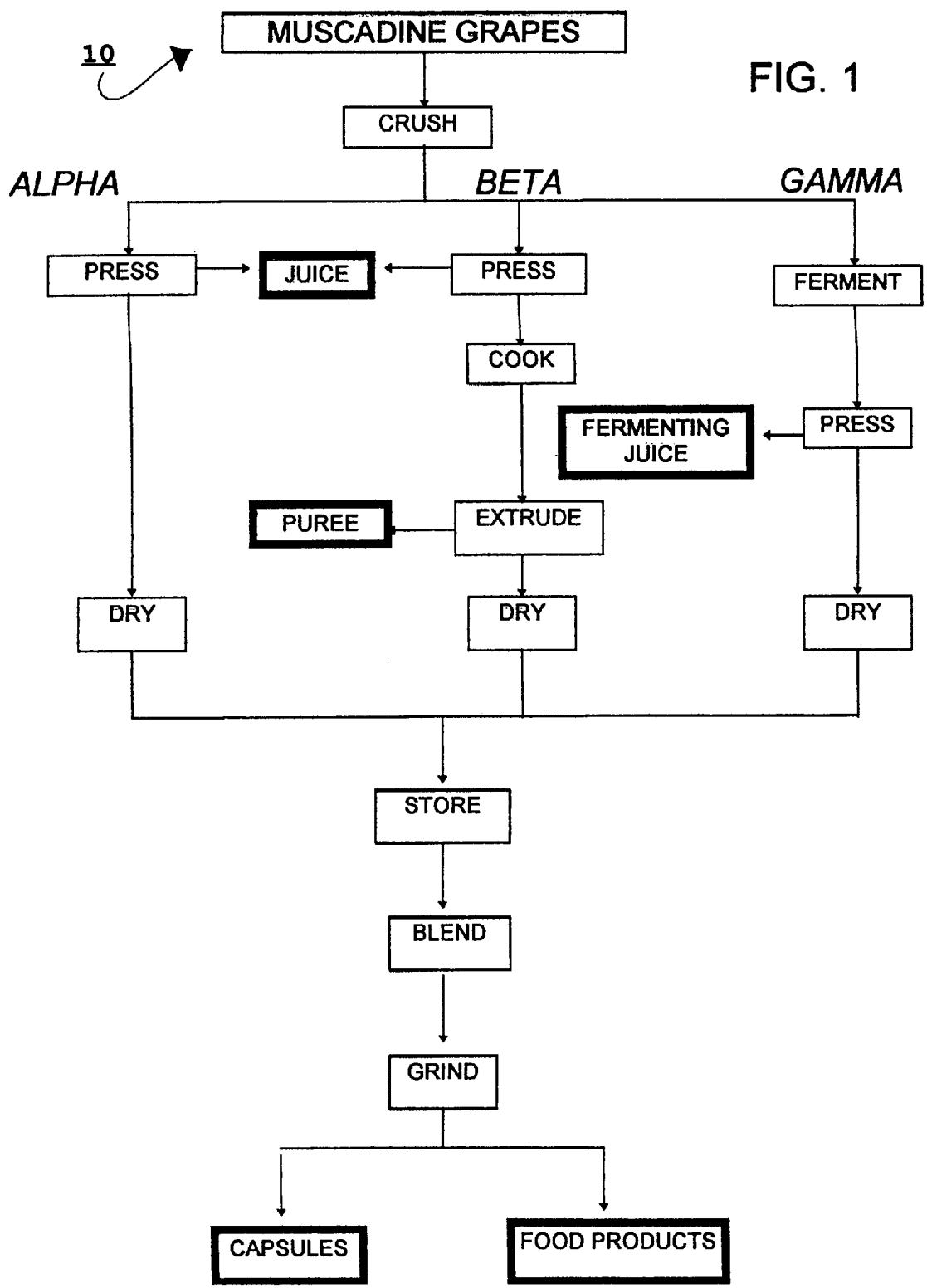
FIG. 1 is a flow diagram illustrating the steps and apparatus used in practicing the method of the present invention. The same reference numerals refer to the same parts through the various Figures.

With reference now to the drawings, and in particular to FIG. 1 thereof, the preferred embodiment of the new and improved method for preparing a natural product embodying the principles and concepts of the present invention and generally designated by the reference numeral 10 will be described.

Description of the Preferred Embodiment

The present invention, the method of preparing a natural product 10 is comprised of a plurality of components. Such components in their broadest context include a crushing and pressing of various muscadine grapes, breaking down the pulp of the crushed grapes (minus juice), drying and storing the natural product, blending then encapsulating or using the natural product 10 in food products. Such components are individually configured and correlated with respect to each other so as to attain the desired objective.

The method is for preparing a natural product that is readily digestible upon consumption as a dietary supplement containing high quantities of resveratrol, ellagic acid, and other phenolic compounds and antioxidants. The main method of the present invention comprises the step of first crushing the muscadine grapes following standard operational procedures. The second step of the main method of the present invention further processes the crushed fruit to break down pulp through one of three distinct, the methods Alpha, Beta or Gamma methods.

The Alpha Method utilizes a bladder press to gently squeeze the crushed fruit, thereby extracting juice. The dejuiced pomice then continues with processes described by the main method.

The Beta Method of the present invention further comprises breaking down the pulp of the crushed and dejuiced muscadines. This is effected through heating and cooking the pomace following enzymatic action through a period of 24 to 36 hours.

The next step in the Beta Method of the present invention comprises removing the broken-down pulp, as puree, from the pomace. This is preferably done by extruders. The remaining skins/seeds continue with processes outlined in the main method.

The Gamma Method of the present invention comprises the steps of crushing muscadine grapes (vitis rotundifolia) following standard operational procedures. A second step of the method comprises the fermentation of the juice in the crushed grapes. A third step of this method comprises removing the fermenting juice from the pomace by pressing. The remaining skins/seeds continue with processes outlined in the main method.

The third step of the main method comprises placing the pomace or skins/seeds derived from Alpha, Beta, or Gamma methods into a modified, rotary drum dryer at about 180 degrees Fahrenheit and drying the contents to less than 1 percent moisture. The dryer drum has been modified so that the drum is made of 1/8" perforated stainless steel.

The fourth step of the main method comprises bagging the dried material into plastic freezer bags and storing in food-grade containers in a room. The room, preferably, has a temperature of between about 60 degrees and 70 degrees Fahrenheit.

The fifth step of the main method consists of blending the dried materials produced through the Alpha, Beta, or Gamma Methods.

Lastly, a step of the method comprises finely grinding the dried materials before encapsulating such material in food products including gelatin capsules.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of preparing a dietary supplement comprising resveratrol from grapes, readily digestible upon consumption, the method comprising the steps of:

crushing muscadine grapes using a bladder press;
   preparing dried derived products from the crushed muscadine grapes by processing the crushed grapes utilizing the following process:
   a) pressing the crushed grapes to thereby produce a dejuiced pomace; and
      drying the pomace;
   b) pressing the crushed grapes to thereby produce a dejuiced pomace;
      heating and enzymatically treating the pomace;
      extruding the heated and treated pomace; and
      drying the pomace; and
   c) fermenting the crushed grapes;
      pressing the crushed grapes; and
      drying the crushed grapes;
   blending the dried derived product of a), b), and c) to produce a blended product;
   grinding the blended product; and
   encapsulating the ground product to produce a dietary supplement.

2. The method according to claim 1, wherein the drying step in a), b) and c) comprises a placing the pomace and crushed grapes in a rotary drum and drying at about 180 degrees Fahrenheit to a moisture of less than 1%.

3. The method according to claim 1, wherein the pressing steps in a), b) and c) are carried out in a bladder press.

4. The method according to claim 1, further comprising the step of bagging the dried pomace and crushed grapes of a), b) and c) in plastic freezer bags and storing the bags in food-grade container at a temperature of between about 60 degrees and 70 degrees Fahrenheit, prior to the blending step.

5. The method according to claim 1, wherein b) further comprises producing a broken-down pulp form pomace through heating the pomace following enzymatic treatment for a period of 24 to 36 hours.

6. The method according to claim 5, further comprises removing the broke-down product from the pomace by extrusion.

7. The method according to claim 1, wherein the step of encapsulating the ground product comprises encapsulating the ground product in gelatin capsules.

* * * * *